United States Patent [19]

Kishi et al.

[11] Patent Number: 4,739,489
[45] Date of Patent: Apr. 19, 1988

[54] AREA CUTTING METHOD

[75] Inventors: Hajimu Kishi; Masaki Seki; Takashi Takegahara, all of Tokyo, Japan

[73] Assignee: Fanuc Ltd., Minamitsuru, Japan

[21] Appl. No.: 767,797

[22] PCT Filed: Dec. 14, 1984

[86] PCT No.: PCT/JP84/00591
§ 371 Date: Aug. 13, 1985
§ 102(e) Date: Aug. 13, 1985

[87] PCT Pub. No.: WO85/02571
PCT Pub. Date: Jun. 20, 1985

[30] Foreign Application Priority Data

Dec. 14, 1983 [JP] Japan .................. 58-235460

[51] Int. Cl.$^4$ .................. G06F 15/46; G05B 19/18
[52] U.S. Cl. ................... 364/474; 318/571; 318/579
[58] Field of Search ............. 364/474, 475, 167–171, 364/520; 318/571, 578, 579

[56] References Cited

U.S. PATENT DOCUMENTS

| | | | |
|---|---|---|---|
| 4,064,445 | 12/1977 | Wenzel | 318/578 |
| 4,355,362 | 10/1982 | Imazeki et al. | 318/579 X |
| 4,467,432 | 8/1984 | Imazeki et al. | 318/578 X |
| 4,535,408 | 8/1985 | Kishi et al. | 364/475 |
| 4,580,225 | 4/1986 | Thompson | 318/579 X |

Primary Examiner—Joseph Ruggiero
Attorney, Agent, or Firm—Staas & Halsey

[57] ABSTRACT

The present invention provides an area cutting method for machining an area (AR) bounded by the curve (OLC) of a predetermined external shape previously using a unidirectional cutting motion. The invention has a step of performing cutting along an i-th cutting path ($PT_i$), a step, executed after completion of cutting along the cutting path ($PT_i$), of moving a tool (TL) in a cutting-feed mode along the curve (OLC) of the external shape from a machining end point ($Q_i$) on the cutting path to a machining end point ($Q_{i-1}$) on an (i−1)th cutting path ($PT_{i-1}$) previously cut, a step of positioning the tool (TL) from the point ($Q_{i-1}$) to a machining starting point ($P_i$) on the cutting path ($PT_i$), a step of moving the tool in the cutting-feed mode along the curve of the external shape from the machining starting point ($P_i$) on the cutting path ($PT_i$) to a machining starting point ($P_{i+1}$) on the next cutting path ($PT_{i+1}$), a step of moving the tool in the cutting-feed mode along the cutting path ($PT_{i+1}$) to execute cutting along the cutting path ($PT_{i+1}$), and a step of repeating these steps to perform area machining.

14 Claims, 6 Drawing Sheets

AREA CUTTING METHOD

DESCRIPTION

CROSS REFERENCES TO RELATED APPLICATIONS

This application is related to U.S. applications having Ser. Nos. 768,118 now U.S. Pat. Nos. 4,706,200; 767,265; and 776,205 now U.S. Pat. No. 4,706,201.

Background of the Invention

1. Field of the Invention

This invention relates to an area cutting method and, more particularly, to an area cutting method for cutting an area bounded by a predetermined curve of an external shape by moving a tool along a cutting path in a first direction to perform machining, positioning the tool at a machining starting point on the next cutting path, which is shifted from the above-mentioned cutting path a predetermined amount in a second direction, after the completion of machining along the above-mentioned cutting path, thereafter moving the tool along the next cutting path in the first direction to perform machining, and thereafter repeating such unidirectional cutting.

2. Description of the Related Art

Figure 1A:
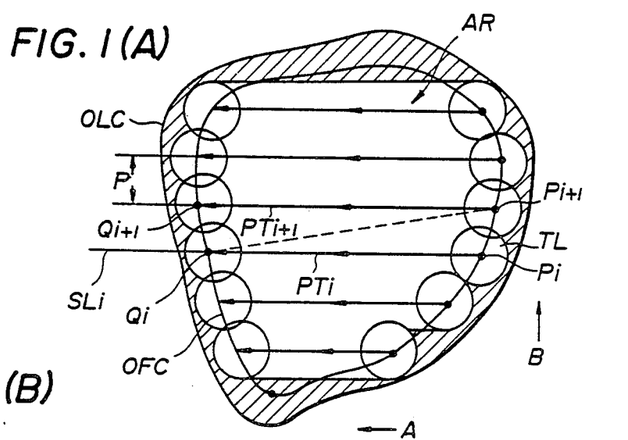
FIGS. 1(A) and 1(B) are views for describing the conventional area cutting method.
Figure 1B:
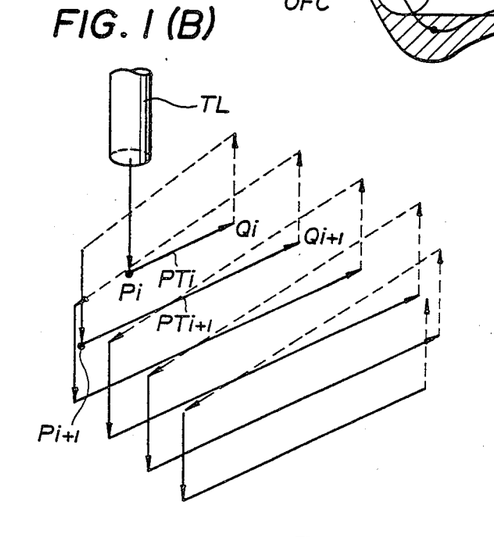

Forms of numerically controlled machining include cutting in which the interior of an area bounded by the curve of an external shape is hollowed out down to a predetermined depth, and die milling in which the interior of an area is die milled. In such cutting of the interior of an area, the process includes (a) entering the curve OLC of an external shape of an area AR shown in FIG. 1(A), cutting direction (direction of arrow A), cut-in direction (direction of arrow B), and cut-in pitch P, (b) creating a cutting path $PT_i$ on the basis of the entered data, (c) performing cutting by moving a tool TL in the cutting direction along the created cutting path $PT_i$ from the machining starting point $P_i$ to the machining end point $Q_i$ on the cutting path $PT_i$, (d) raising the tool a predetermined amount along the Z axis in the rapid-traverse mode after the completion of cutting along the above-mentioned cutting path [see FIG. 1(B)], (e) moving the tool in the rapid-traverse mode to a point directly above a machining starting point $P_{i+1}$ on the next cutting path $PT_{i+1}$, which is shifted in the cutting direction by the pitch P, after the completion of the raising operation, (f) then moving the tool in the cutting-feed mode along the —Z axis to the machining starting point $P_{i+1}$, and (g) thereafter performing cutting by moving the tool TL in the cutting direction from the machining starting point $P_{i+1}$ to the machining end point $Q_{i+1}$ on the cutting path $PT_{i+1}$, and subsequently repeating these unidirectional cutting motions to machine the area AR. Further, (h) when the amount remaining in the cut-in direction (direction of arrow A) is less than the pitch P, the tool is moved along the curve OLC of the external shape in the cutting feed mode to remove the uncut portion. It should be noted that, for each cutting path $PT_i$ (i = 1, 2, ...), two points $P_i$ and $Q_i$ where a straight line $SL_i$ determined by the cut-in direction and pitch P intersects an offset curve OFC that takes finishing tolerance t and cutter radius $r_a$ into account are specified as machining starting and end points, respectively.

Figure 2:
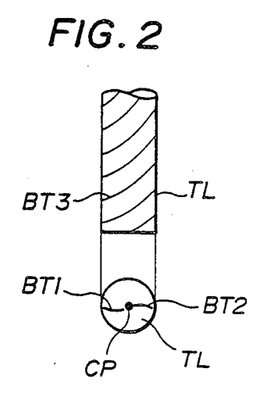
FIG. 2 is a view of tool change.
Figure 3:
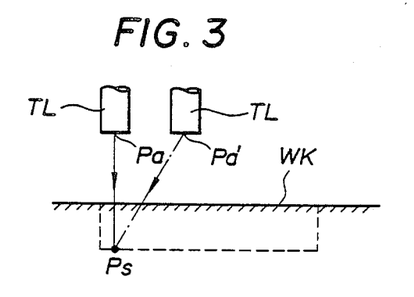
FIG. 3 is a view for describing a method of moving a tool to a starting point $P_s$ in a cut-in direction.

A tool referred to as an end mill is used as the tool. As shown in FIG. 2, an end mill includes a bottom surface having cutting edges BT1 and BT2, and a cutter side having a cutting edge BT3. Longitudinal cutting is performed by the cutting edges BT1, BT2, and transverse cutting is carried out by the cutting edge BT3. A small cutting force is applied in the longitudinal direction, and a large cutting force in the transverse direction. The workpiece is a solid material prior to the cutting of an area. Moreover, the center position CP (see FIG. 2) of the bottom surface of the tool (end mill) TL does not rotate (i.e., is stationary) even when the tool TL is rotated. Consequently, when the initial cut is to be made, even though the tool TL is moved for cutting feed from an approach starting point $P_a$, which is located directly above the cutting starting point $P_s$ shown in FIG. 3, toward the cutting starting point $P_s$ while being rotated, the tool TL slides along the surface of the workpiece WK rather than cutting into the workpiece or, even if it does cut into the workpiece, it fails to do so smoothly and results in a machining error. Accordingly, it is necessary to move the tool TL in the cutting-feed mode from a position $P_a'$, which is displaced from a point directly above the cutting starting point $P_s$, toward the cutting starting point $P_s$ along an oblique path, as shown by the one-dot chain line in FIG. 3, whereby the tool cuts into the workpiece smoothly.

Figure 4:
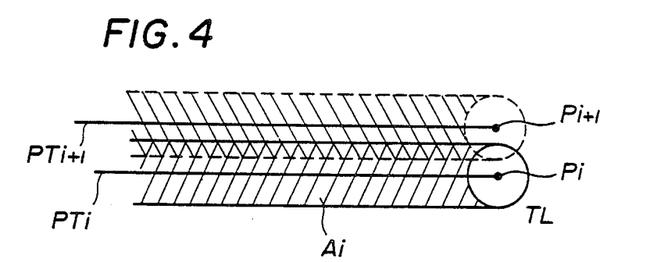
FIG. 4 is a view for describing tool overlap when a tool is moved along i-th and (i+1)th cutting paths.

When the tool TL is moved along the (i+1)th cutting path $PT_{i+1}$ in the conventional area machining method using unidirectional cutting, the tool travels while slightly overlapping the area $A_i$ (see FIG. 4) already cut by tool movement along the i-th cutting path $PT_i$. However, the amount of overlap is small. Therefore, unless some consideration is given to this when positioning the tool at the machining starting point $P_{i+1}$ on the cutting path $PT_{i+1}$, the tool will not bite into the workpiece satisfactorily, just as when the tool was moved with respect to the solid material. According to the conventional method, therefore, after the tool is positioned directly above the machining starting point $P_{i+1}$ in the rapid-traverse mode, the tool is moved toward the machining starting point $P_{i+1}$ at a low-velocity cutting feed so that the tool will bite into the workpiece. With this method, however, the time needed to machine an area is lengthened because the tool must be moved at the low-velocity cutting feed toward each machining starting point on numerous cutting paths. Machining time is prolonged even further with the conventional method since it is necessary to cut away the uncut portion [the shaded portion in FIG. 1(A)] by finally moving the tool along the curve of the external shape.

SUMMARY OF THE INVENTION

An object of the present invention is to provide an area cutting method whereby an area can be machined while repeating machining along a cutting path in one direction and machining along parts of a curve of an external shape.

Another object of the present invention is to provide an area cutting method for moving a tool in the cutting-feed mode along a curve of an external shape from a machining end point $Q_i$ on a cutting path $PT_i$ just cut to a machining end point $Q_{i-1}$ on a cutting path $PT_{i-1}$ previously last, thereafter moving the tool in the rapid-traverse mode to a machining starting point $P_i$ on the cutting path $PT_i$, then moving the tool in the cutting-feed mode along the curve of the external shape from $P_i$ to a machining starting point $P_{i+1}$ on the next cutting path $PT_{i+1}$, and subsequently repeating the above-described cycle to perform area cutting, whereby all movement (retraction motion, approach motion) along the Z axis is performed in the rapid-traverse mode and final tool movement along the curve of the external shape is dispensed with without leaving uncut portions.

The present invention provides an area cutting method for machining the interior of an area bounded by a curve of a predetermined external shape. The area cutting method has a step, executed after completion of cutting along a cutting path $PT_i$, of moving a tool in the cutting-feed mode along a curve OLC of an external shape from a machining end point $Q_i$ on a cutting path $PT_i$ to a machining end point $Q_{i-1}$ on a cutting path $PT_{i-1}$ previously last, a step of positioning the tool at a machining starting point $P_i$ on the cutting path $PT_i$, a step of moving the tool in the cutting-feed mode along the curve of the external shape from the machining starting point $P_i$ on the cutting path $PT_i$ to a machining starting point $P_{i+1}$ on a next cutting path $PT_{i+1}$, a step of moving the tool in the cutting-feed mode along the cutting path $PT_{i+1}$ to execute cutting along the cutting path $PT_{i+1}$, and a step of repeating each of these steps to perform area cutting. According to this area cutting method, all movement along the Z axis is performed in the rapid-traverse mode, thereby enabling the time required for area cutting to be reduced.

BRIEF DESCRIPTION OF THE DRAWINGS

FIG. 7, including 7(A) and 7(B), is flowchart of processing for implementing the area cutting method of the present invention;

DESCRIPTION OF THE PREFERRED EMBODIMENTS

Figures 5A, 5B:
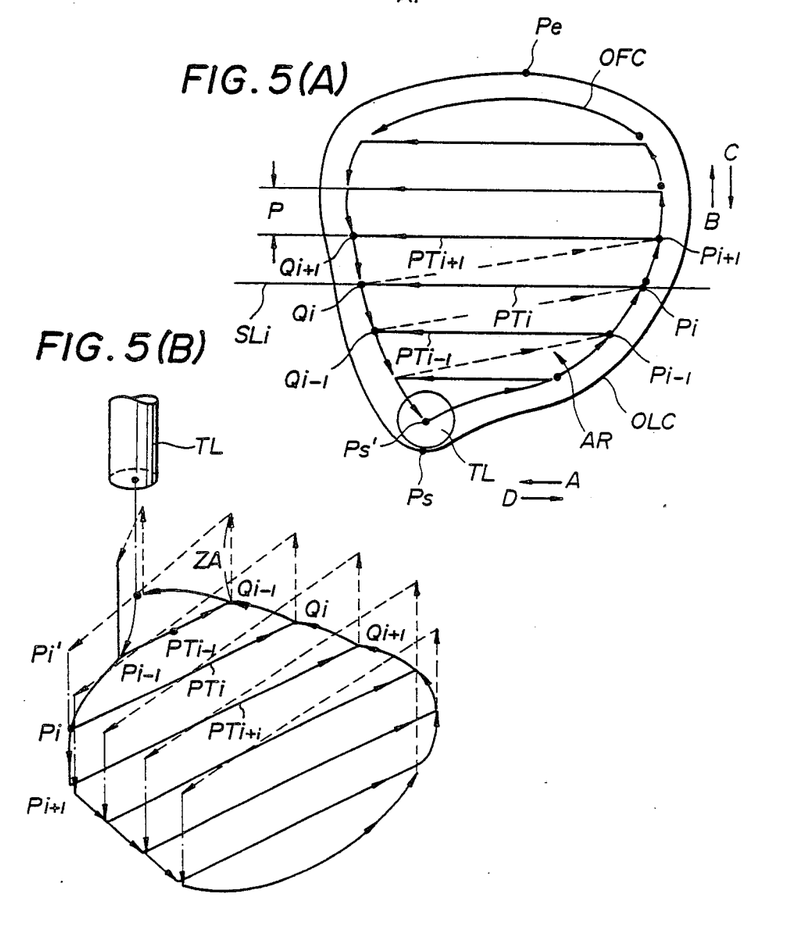
FIGS. 5(A) and 5(B) are views for describing the present invention in general terms.

FIG. 5 is a view for describing the present invention in general terms. The present invention is an area cutting method for moving a tool TL in a predetermined direction (direction of arrow A) along a cutting path $PT_i$ to machine the interior of an area, thereafter moving the tool in a direction identical with direction arrow A along the next cutting path $PT_{i+1}$, which is shifted by a predetermined amount P, to machine the interior of the area, and repeating these unidirectional cutting motions to machine an area AR bounded by the curve OLC of a predetermined external shape. The area cutting method has a step, executed after completion of cutting along the cutting path $PT_i$, of moving a tool in the cutting-feed mode along the curve OLC of the external shape from a machining end point $Q_i$ on the cutting path $PT_i$ to a machining end point $Q_{i-1}$ on a cutting path $PT_{i-1}$ previously cut, a step of positioning the tool at a machining starting point $P_i$ on the cutting path $PT_i$, a step of moving the tool in the cutting-feed mode along the curve of the external shape from the machining starting point $P_i$ on the cutting path $PT_i$ to a machining starting point $P_{i+1}$ on the next cutting path $PT_{i+1}$, a step of moving the tool in the cutting-feed mode along the cutting path $PT_{i+1}$ to execute cutting along the cutting path $PT_{i+1}$, and a step of repeating each of these steps to perform area cutting.

Figure 6:
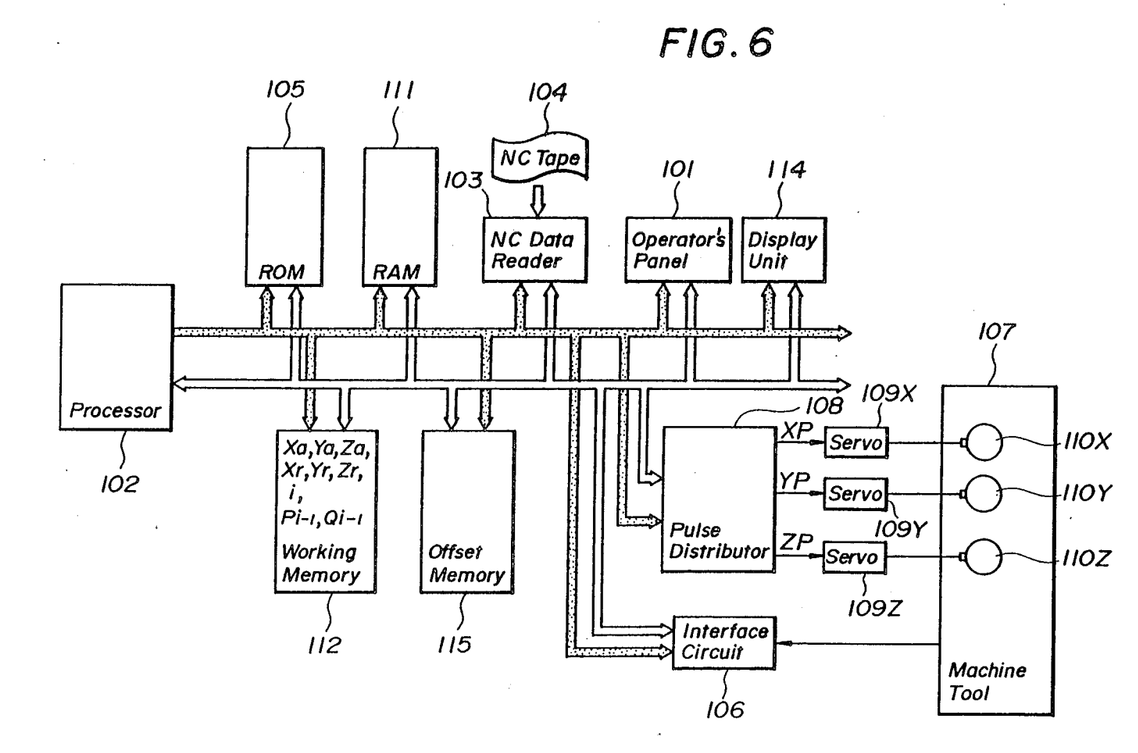
FIG. 6 is a block diagram of an embodiment of the present invention.
Figure 7A:
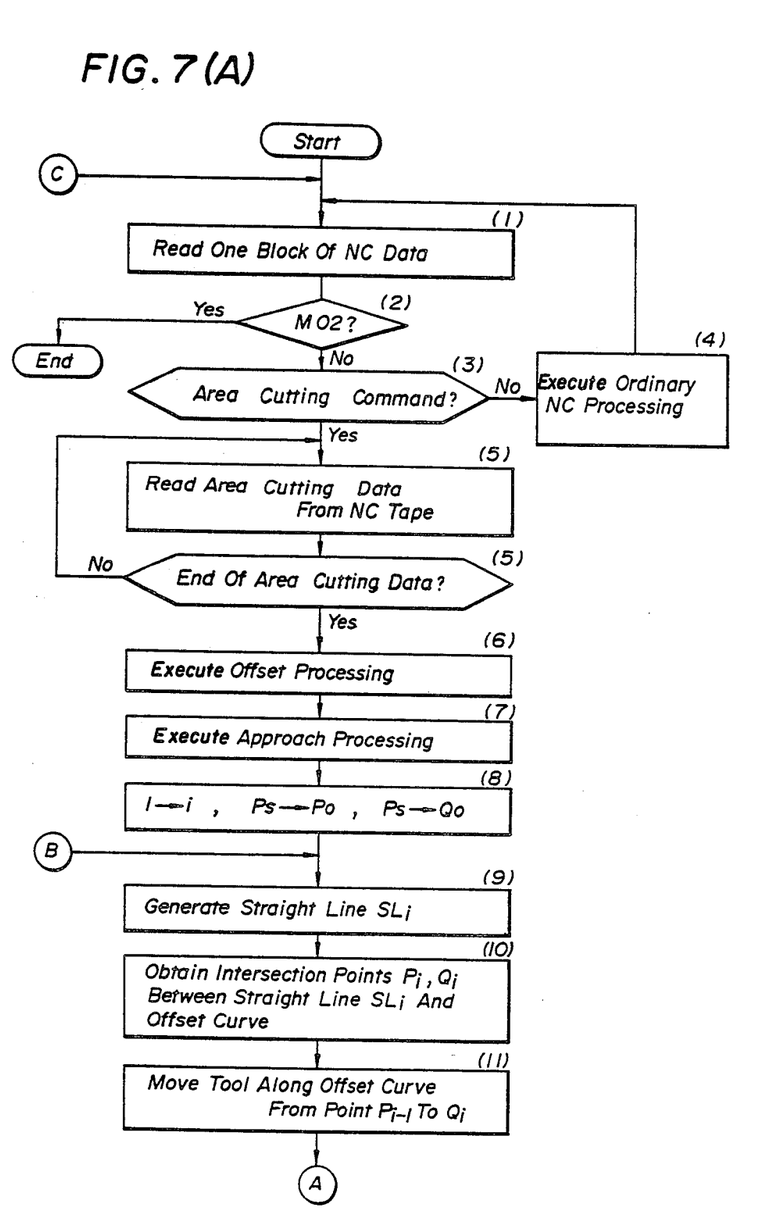
Figure 7B:
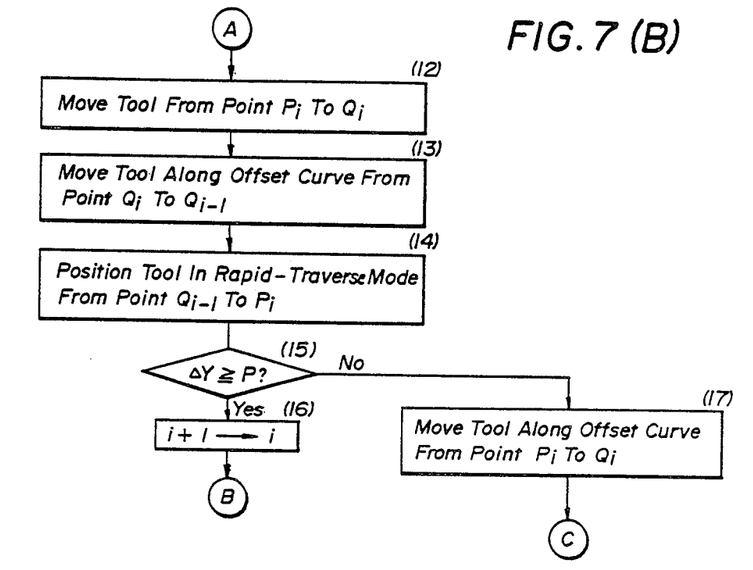

FIG. 6 is a block diagram of an embodiment of the present invention, and FIG. 7 is a flowchart of processing according to the present invention. The area cutting method of the present invention will now be described in accordance with FIGS. 5, 6 and 7.

(1) When a cycle start button on an operator's panel 101 is pressed, a processor 102 causes an NC data reader 103 to read one block of NC data from an NC tape 104. The NC tape 104 stores area cutting data in addition to ordinary path data, G-function instruction data and M-, S- and T-function instruction data. Stored at the end of the NC program is an M code (M02) indicating the end of the program. Placed at the beginning of the area cutting data is an area cutting command indicating that the data which follow are the area cutting data. Placed at the end of the area cutting data is a code indicative of the end of the area cutting data.

(2) The processor 102, placed under the control of a control program stored in a ROM 105, checks whether an item of the read NC data is "M02", which is indicative of the program end. If the item of data is "M02", numerical control processing is ended.

(3) If the item of read NC data is not "M02" indicative of program end, then the processor 102 checks whether the item of NC data is the area cutting command.

(4) If the item of NC data is not the area cutting command, the processor 102 executes ordinary numerical control processing.

By way of example, if an item of NC data is an M-, S- or T-function instruction, the processor delivers the data to a machine tool 107 via an interface circuit 106 between an NC unit and the machine. When the machine tool 107 generates a completion signal indicating completion of processing for the M-, S- or T-function instruction, the processor causes the NC data reader 103 to read the next item of NC data.

If the item of NC data is path data, then the following path control processing is executed. Specifically, the processor obtains incremental values $X_i$, $Y_i$, $Z_i$ along the respective axes, obtains velocity components $F_x$, $F_y$, $F_z$ along the respective axes from equations $$F_x = X_i \cdot F / \sqrt{X_i^2 + Y_i^2 + Z_i^2} \quad \text{(1a)}$$

$$F_y = Y_i \cdot F / \sqrt{X_i^2 + Y_i^2 + Z_i^2} \quad \text{(1b)}$$

$$F_z = Z_i \cdot F / \sqrt{X_i^2 + Y_i^2 + Z_i^2} \quad \text{(1c)}$$

based on the incremental values and a commanded feed velocity F, thereafter obtains travelling quantities $\Delta X$, $\Delta Y$, $\Delta Z$, which are to be traversed along the respective axes in a predetermined period of time $\Delta T$ seconds (=8 msec), from equations $$\Delta X = F_x \cdot \Delta T \quad \text{(2a)}$$

$$\Delta Y = F_y \cdot \Delta T \quad (2b)$$

$$\Delta Z = F_z \cdot \Delta T \quad (2c)$$

The processor delivers $\Delta X$, $\Delta Y$, $\Delta Z$ to a pulse distributor 108 every $\Delta T$ sec. On the basis of the input data ($\Delta X$, $\Delta Y$, $\Delta Z$), the pulse distributor 108 performs a simultaneous three-axis pulse distribution calculation to generate distributed pulses $X_P$, $Y_P$, $Z_P$. The distributed pulses are applied as inputs to servo circuits 109X, 109Y, 109Z for the respective axes to rotate servomotors 110X, 110Y, 110Z. The tool is thus moved relative to the workpiece toward a target position.

The processor 102, in accordance with the following formulae, updates the present position $X_a$, $Y_a$, $Z_a$ along the respective axes every $\Delta T$ sec, $X_a$, $Y_a$, $Z_a$ having been stored in a working memory 112:

$$X_a \pm \Delta X \rightarrow X_a \quad (3a)$$

$$Y_a \pm \Delta Y \rightarrow Y_a \quad (3b)$$

$$Z_a \pm \Delta Z \rightarrow Z_a \quad (3c)$$

The sign depends upon the direction of movement. Similarly, in accordance with the following formulae, the processor 102 updates remaining traveling distances $X_r$, $Y_r$, $Z_r$ (the initial values of which are the incremental values $X_i$, $Y_i$, $Z_i$, respectively) every $\Delta T$ sec, $X_r$, $Y_r$, $Z_r$ having been stored in the working memory 112:

$$X_r - \Delta X \rightarrow X_r \quad (4a)$$

$$Y_r - \Delta Y \rightarrow Y_r \quad (4b)$$

$$Z_r - \Delta Z \rightarrow Z_r \quad (4c)$$

When the following condition is established:

$$X_r = Y_r = Z_r = 0 \quad (5)$$

the processor 102 then causes the NC data reader 103 to read the next item of NC data.

(5) If the item of NC data is found to be the area cutting command at the decision step (3), the processor 102 causes the NC data reader 102 to read the area cutting data and store the data in a RAM 111 until the code indicating the end of the area cutting data is read out. It should be noted that the area cutting data are (1) data indicating the curve of the external shape of the area, (2) cutting direction data (data indicating that the tool is to be moved in the direction of the arrow A or in the direction of an arrow D in FIG. 5), (3) cut-in direction data (data indicating that the tool is to be moved in the direction of the arrow B or in the direction of an arrow C in FIG. 5), (4) pitch P in the cut-in direction, (5) cutting velocity, (6) coordinate values of a starting point $P_s$ in the cut-in direction, (7) coordinate values of an end point $P_e$ in the cut-in direction, (8) the position of an approach plane, and the like. Hereafter we will assume that the cutting direction is the $-X$ direction, that the cut-in direction is the $+Y$ direction, that the approach plane is parallel to the XY plane at a height ZA, that the coordinate values of the cut-in direction starting point $P_s$ are $(X_s, Y_s)$, and that the coordinate values of the cut-in direction end point $P_e$ are $(X_e, Y_e)$.

Figure 8:
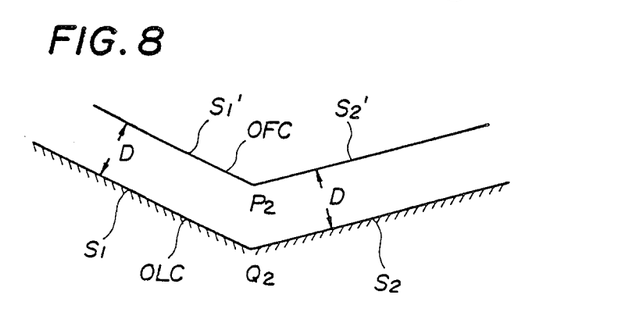
FIG. 8 is a view for describing offset processing.

(6) When the reading of the area cutting data ends, the processor 102 calculates the curve OFC (FIG. 5), which is offset from the curve OLC of the external shape by a distance $D$ ($=r_a+t$), the latter being obtained by adding the tool radius $r_a$ and the finishing tolerance $t$. It should be noted that the tool radius $r_a$ is obtained by reading a radius value corresponding to a commanded tool number from an offset memory 113, which stores the correspondence between tool numbers and tool radii. The offset curve OFC is found through the following processing. Specifically, as shown in FIG. 8, let two straight lines specifying the curve OLC of the external shape be S1 and S2. Straight lines S1', S2' offset from the straight lines S1, S2, respectively, by the distance D are found. The intersection P2 of the straight lines S1', S2' is then found. The intersection P2 is one point specifying the offset curve OFC. Accordingly, if points of intersection are found in a similar manner and stored in the RAM 111, the offset curve OFC will be obtained.

(7) When an offset point $P_s'$ [FIG. 5(A)] corresponding to the cut-in direction starting point $P_s$ is found by offset calculation, the tool TL is moved from the initial position and positioned at an approach point near the offset point $P_s'$, then the tool is moved obliquely toward the workpiece from the approach point in the cutting-feed mode and is positioned at the offset point $P_s'$, just as in the conventional method. (This is approach processing.)

(8) When the tool arrives at the offset point $P_s'$, the processor 102 initializes i, which is stored in the working memory 112, to 1, and sets the offset point $P_s'$ to the machining starting point $P_{i-1}$ ($=P_o$) and to the machining end point $Q_{i-1}$ ($=Q_o$) on the (i−1)th (0th) cutting path $PT_{i-1}$ ($=PT_o$) ($P_s \rightarrow P_o$, $P_s \rightarrow Q_o$).

(9) Next, the processor 102 performs processing for specifying an i-th cutting path $PT_i$. Specifically, the processor 102 creates the straight line $SL_i$. The straight line $SL_i$ is expressed by the equation $$y = Y_s' + P \cdot i$$

where $Y_s'$ is the coordinate of $P_s'$ along the Y axis.

(10) Thereafter, the processor 102 calculates the coordinate values of the points $P_i$, $Q_i$ where the straight line $SL_i$ intersects the offset curve OFC. Of the intersection points $P_i$, $Q_i$, that which has the larger X coordinate value is treated as the machining starting point, and that which has the smaller X coordinate value is treated as the machining end point.

Figures 9A, 9B, 9C:
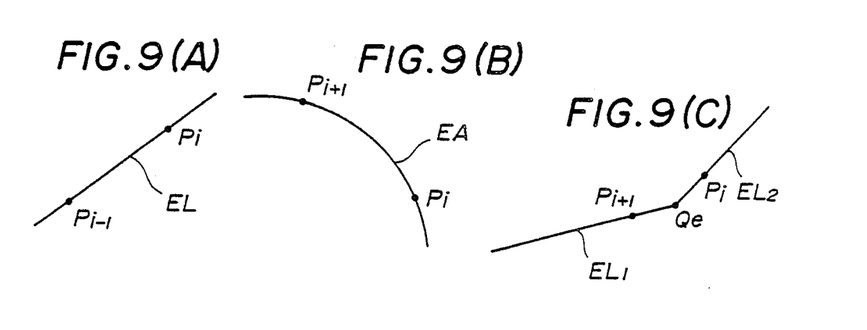
FIGS. 9(A)-9(C) are views for describing path processing for moving a tool along the curve of an external shape.

(11) When the two intersection points $P_i$, $Q_i$ specifying the i-th cutting path $PT_i$ have been found, the processor 102 performs path processing for moving the tool in the cutting-feed mode along the curve OLC (offset curve OFC) of the external shape from the machining starting point $P_{i-1}$ of the (i−1)th cutting path $PT_{i-1}$ to the machining starting point $P_i$ of the cutting path $PT_i$. It should be noted that the offset curve is composed of a number of straight lines and circular arcs (each of which is referred to as a line element). Therefore, in a case where the points $P_{i-1}$, $P_i$ both lie on the same line element (straight line EL, circular arc EA), as shown in FIGS. 9(A) and 9(B), path processing described at step (4) is executed with the points $P_{i-1}$, $P_i$ serving as the starting and end points, respectively. If the points $P_{i-1}$, $P_i$ do not lie on the same line element, as shown in FIG. 9(C), first path processing, in which the point $P_{i-1}$ and an end point $Q_e$ of an element $EL_1$ on which the point $P_{i-1}$ lies serve as the starting and end points, respectively, and second path processing, in which a starting point $Q_s$ ($=Q_e$) on an element $EL_2$ on which the point $P_i$ lies and the point $P_i$ serve as the starting and end points, respectively, are executed in the same manner as the path processing of step (4).

(12) When the tool arrives at the machining starting point $P_i$ on the cutting path $PT_i$, the processor 102 executes the path processing of step (4) to move the tool from the point $P_i$ to the point $Q_i$ in the cutting-feed mode, thereby to execute cutting along the cutting path $PT_i$.

(13) Upon the completion of cutting, the processor 102 executes path processing for moving the tool in the cutting-feed mode along the offset curve OFC from the machining end point $Q_i$ of the i-th cutting path $PT_i$ to the machining end point $Q_{i-1}$ of the cutting path $PT_i$ cut last. It should be noted that the path processing is performed in the same manner as step (11).

(14) Next, the processor 102 moves the tool by the amount ZA in the rapid-traverse mode along the +Z axis, thereafter moves the tool in the rapid-traverse mode along the approach plane to a point $P_i'$ [see FIG. 5(B)] directly above the machining starting point $P_i$ of the cutting path $PT_i$, and then positions the tool at the point $P_i$ in rapid traverse or at a velocity (much higher than cutting-feed velocity) slightly lower than the rapid-traverse velocity.

(15) When the tool has been positioned at $P_i$, the processor 102 obtains the difference $\Delta Y (= Y_e' - Y_a)$ between the present position coordinate (stored in the working memory 112) $Y_a$ along the Y axis and the Y-axis coordinate $Y_e'$ of the point $P_e'$ offset from the cut-in direction end point $P_e$ and checks whether or not the difference is greater than the pitch P.

(16) If $\Delta Y \geq P$ is true, the processor 102 performs the operation $$i+1 \to i$$

and repeats the processing from step (9) onward.

(17) If $\Delta Y < P$ is true, then the processor 102 performs area cutting by moving the tool along the offset curve OFC from the machining starting point $P_i$ to the machining end point $Q_i$ of the cutting path $PT_i$.

Even though the foregoing description relates to a case where the shape of the area is that shown in FIG. 5, the present invention is not limited thereto and can be applied to areas of various shapes.

Figure 10:
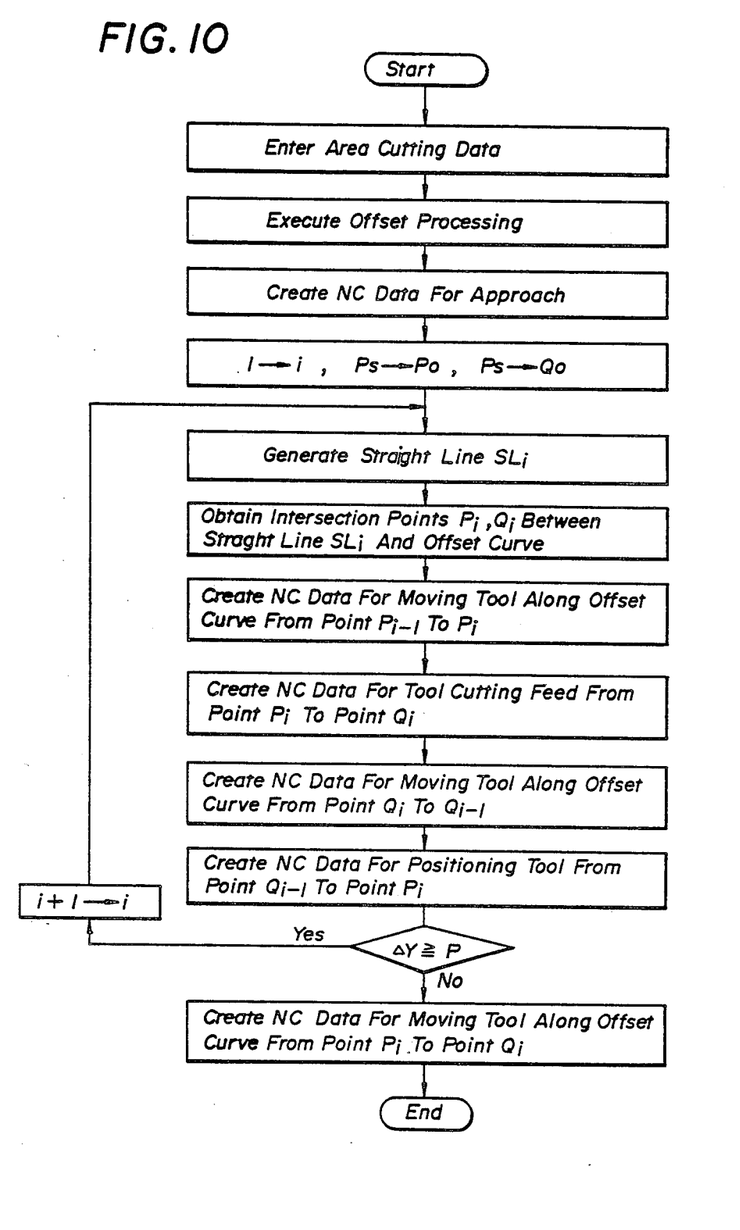
FIG. 10 is a flowchart of processing for creating NC data for area cutting.
Figure 11A:
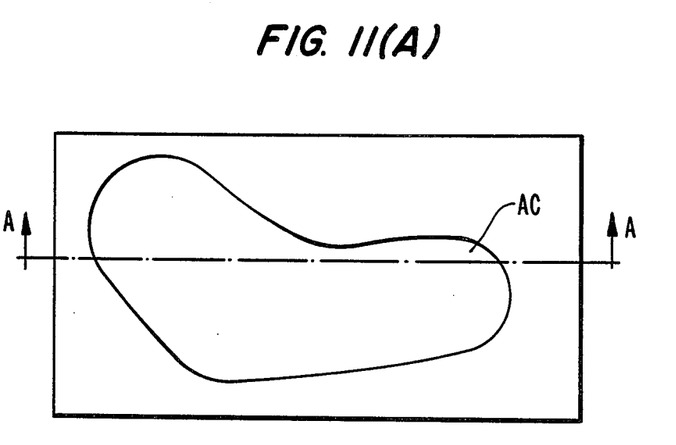
FIGS. 11(A) and 11(B) illustrate the two dimensional machining performed by the machining motions depicted in FIGS. 5(A) and 5(B). The area cut by the process is indicated by the reference characters AC.
Figure 11B:
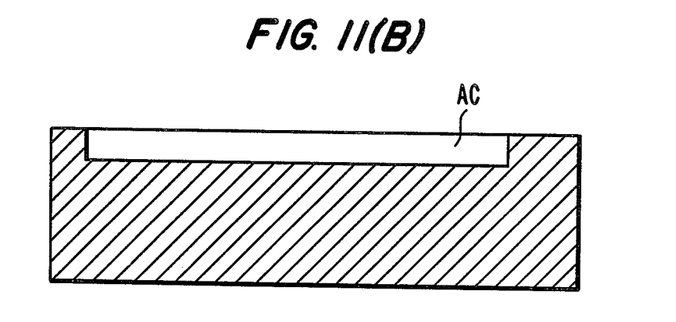

Further, in the case described above, an area cutting command is inserted into the NC tape, cutting paths are successively created by using the area cutting data that follows the area cutting command, and area cutting is performed by moving the tool along the cutting paths. However, the invention is not limited to such a situation and an arrangement can be adopted in which an NC tape (NC data) is created by the above-mentioned method and the NC tape is loaded in an NC unit so that area cutting may be performed. FIG. 10 is a flowchart of processing for creating an NC tape for area cutting. The NC data creation processing is almost the same as the processing from step (5) onward in FIG. 7, the only difference being that NC data for cutting or for positioning is created instead of moving the tool.

As described above, the present invention is arranged to move a tool in the cutting-feed mode along a curve OLC of an external shape from a machining end point $Q_i$ on a cutting path $PT_i$ just cut to a machining end point $Q_{i-1}$ on a cutting path $PT_{i-1}$ previously cut, thereafter position the tool in the rapid-traverse mode at a machining starting point $P_i$ on the cutting path $PT_i$, then move the tool in the cutting-feed mode along the curve of the external shape from the point $P_i$ to a machining starting point $P_{i+1}$ on the next cutting path $PT_{i+1}$, and subsequently repeat the above-described cycle to perform area cutting. Therefore, all movement (retraction motion, approach motion) along the Z axis is performed in the rapid-traverse mode and final tool movement along the curve of the external shape is dispensed with without leaving uncut portions. This enables the time required for area cutting to be reduced.

What we claim is:

1. An area cutting method, comprising the steps of:

moving a tool and cutting in a predetermined first direction along a cutting path $PT_i$ to machine an interior of an area, the first direction being limited to a substantially two-dimensional plane;

moving the tool and cutting in the first direction along the next cutting path $PT_{i+1}$, which is shifted by a predetermined amount within the two-dimensional plane, to machine the interior of the area;

repeating the first direction cutting motions to machine an area defined by the two-dimensional plane and bounded by a curve of a predetermined external shape;

moving the tool and cutting in a cutting-feed mode along the curve of the external shape within the two-dimensional plane from a machining end point $Q_i$ on said cutting path $PT_i$ to a machining end point $Q_{i-1}$ on a cutting path $PT_{i-1}$ previously cut after completion of cutting along the cutting path $PT_i$;

positioning the tool by moving from the point $Q_{i-1}$ to a machining starting point $P_i$ on the cutting path $PT_i$ after the cutting of path $PT_i$; and moving the tool and cutting in the cutting-feed mode along the curve of the external shape within the two-dimensional plane from the machining starting point $P_i$ on the cutting path $PT_i$ to a machining starting point $P_{i+1}$ on the next cutting path $PT_{i+1}$ before cutting the path $PT_{i+1}$.

2. An area cutting method according to claim 1, wherein the positioning is executed in a rapid-traverse mode.

3. An area cutting method according to claim 1, further comprising a step of entering data necessary for area cutting.

4. An area cutting method according to claim 3, further comprising the steps of:

including cutting path shift direction and an amount of cutting path shift in said area cutting data in advance;

obtaining from said shift direction and amount of shift a straight line specifying the next cutting path $PT_{i+1}$; and designating two points at which said straight line intersects an offset curve offset a predetermined amount from the curve of the external shape as the machining starting and end points $P_{i+1}$, $Q_{i+1}$, respectively, of the cutting path $PT_{i+1}$.

5. An area cutting method according to claim 4, wherein said positioning step includes the steps of:

raising the tool in the rapid-traverse mode up to an approach plane specified by the area cutting data;

moving the tool along said approach plane in the rapid-traverse mode to a point directly above the point $P_i$; and moving the tool in the rapid-traverse mode to the point $P_i$.

6. An area cutting method according to claim 1, further comprising the steps of:
   determining whether a remaining cut-in width is smaller than said predetermined value specified by the area cutting data; and
   moving the tool in the cutting-feed mode along the curve of the external shape from the point $P_i$ to the point $Q_i$ when the remaining cut-in width is smaller than said predetermined value.

7. An area cutting method comprising the steps of:
   creating positioning data for moving a tool and cutting in a predetermined first direction along a cutting path $PT_i$ to machine the interior of an area, the first direction being limited to a substantially two-dimensional plane;
   moving the tool and cutting in the first direction along the next cutting path $PT_{i+1}$, which is shifted by a predetermined amount within the two-dimensional plane, to machine the interior of the area;
   creating positioning data for moving the tool and cutting in a cutting-feed mode along the curve of the external shape within the two-dimensional plane from a machining end point $Q_i$ on an i-th cutting path $PT_i$ to a machining end point $Q_{i-1}$ on an (i−1)th cutting path $PT_{i-1}$ after cutting path $PT_i$;
   creating positioning data for moving the tool in a rapid-traverse mode from the point $Q_{i-1}$ to a machining starting point $P_i$ on the cutting path $PT_i$ after cutting path $PT_i$;
   creating positioning data for moving the tool in the cutting-feed mode along the curve of the external shape within the two-dimensional plane from the machining starting point $P_i$ on the cutting path $PT_i$ to a machining starting point $P_{i+1}$ on the next cutting path $PT_{i+1}$ before cutting path $PT_{i+1}$; and
   repeating the creating steps to create all positioning data for area cutting within the two-dimensional plane, and performing area cutting by using said positioning data.

8. An area cutting method according to claim 7, further comprising a step of entering data necessary for area cutting.

9. An area cutting method according to claim 8, further comprising the steps of:
   including cutting path shift direction and an amount of cutting path shift in said area cutting data in advance;
   obtaining from said shift direction and amount of shift a straight line specifying the next cutting path $PT_{i+1}$; and
   designating two points at which said straight line intersects an offset curve offset a predetermined amount from the curve of the external shape as machining starting and end points $P_{i+1}$, $Q_{i+1}$, respectively, of the cutting path $PT_{i+1}$.

10. An area cutting method according to claim 9, wherein said step of creating positioning data for moving from point $Q_{i-1}$ to point $P_i$ comprises creating positioning data for raising the tool in the rapid-traverse mode up to an approach plane specified by the area cutting data, positioning data for moving the tool on said approach plane in the rapid-traverse mode to a point directly above the point $P_i$, and positioning data for moving the tool in the rapid-traverse mode to the point $P_i$.

11. An area cutting method according to claim 7, further comprising the steps of:
   determining whether a remaining cut-in width is smaller than said predetermined value specified by the area cutting data; and
   creating positioning data for moving the tool in the cutting-feed mode along the curve of the external shape from the point $P_i$ to the point $Q_i$ when the remaining cut-in width is smaller than said predetermined value.

12. A substantially two-dimensional area cutting method using a cutting tool having a cutting speed, comprising the steps of:
   (a) cutting from point $P_i$ to point $Q_i$ where $P_i$ is a start point of a current path and $Q_i$ is an end point of a current path;
   (b) cutting from point $Q_i$ to point $Q_{i-1}$ where $Q_{i-1}$ is an end point of a previously cut path;
   (c) moving the tool at speed greater than the cutting speed from point $Q_{i-1}$ to point $P_1$; and
   (d) cutting from point $P_i$ to point $P_{i+1}$ where $P_{i+1}$ is a start point of a succeeding path, points $P_i$, $P_{i+i}$, $Q_i$ and $Q_{i-i}$ lying in a substantially two-dimensional plane.

13. A method as recited in claim 12, wherein step (c) includes the steps of:
   (ci) moving the tool to an approach plane at a rapid traverse speed;
   (cii) moving the tool at a rapid traverse speed to a point $P_i$ above the point $P_i$ and in the approach plane; and
   (ciii) moving the tool from the point $P_i$ to the point $P_i$ at the speed less than the rapid traverse speed.

14. A method as recited in claim 12, wherein the cutting performed in steps (b) and (d) follows an external shape curve.

* * * * *